United States Patent
Chien

(10) Patent No.: US 7,327,474 B2
(45) Date of Patent: Feb. 5, 2008

(54) METHOD AND APPARATUS FOR MEASURING DISPLACEMENT OF AN OBJECT

(75) Inventor: Yang-Chang Chien, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/400,882

(22) Filed: Apr. 10, 2006

(65) Prior Publication Data

US 2007/0008552 A1 Jan. 11, 2007

(30) Foreign Application Priority Data

Jul. 6, 2005 (CN) .................... 2005 1 0035880

(51) Int. Cl.
*G01B 11/14* (2006.01)
(52) U.S. Cl. .................................. 356/614; 356/622
(58) Field of Classification Search ................ 356/614, 356/615, 621, 622
See application file for complete search history.

(56) References Cited

U.S. PATENT DOCUMENTS

| 5,245,863 | A | * | 9/1993 | Kajimura et al. | ............. 73/105 |
| 5,929,983 | A | * | 7/1999 | Lu | .............................. 356/138 |
| 6,862,098 | B1 | | 3/2005 | Tanuma et al. | |

* cited by examiner

*Primary Examiner*—Roy M. Punnoose
(74) *Attorney, Agent, or Firm*—Jeffrey T. Knapp

(57) ABSTRACT

A method for measuring displacement of an object (20) having a flat surface (21), includes the following steps. When the object is in a first position (A), a first laser beam is emitted onto the flat surface at a first incident angle, the first laser beam thereby is reflected by the flat surface and incident onto a light sensitive transducer (30) at a first incident location (35) at a second incident angle. The object is then moved to a second position (B), second laser beam is emitted onto the flat surface at the first incident angle, the second laser is reflected by the flat surface and incident onto the light sensitive transducer at a second incident location (35') at the second incident angle. Lastly the displacement (D) of the object is calculated according to a distance (L) between the first and second incident location.

8 Claims, 2 Drawing Sheets

METHOD AND APPARATUS FOR MEASURING DISPLACEMENT OF AN OBJECT

BACKGROUND OF THE INVENTION

1. Field of the Invention

The present invention relates to methods for measuring displacement (i.e. distance and direction moved) of an object, and more particularly, to a method and an apparatus for measuring displacement of an object having a flat surface, the displacement being in a direction normal to the flat surface.

2. Discussion of the Related Art

With the development of technology, products are increasingly being made smaller and lighter. Thus in manufacturing processes, standards for precise manufacturing technology have become more rigorous. Therefore, measuring precise distance and position has become more important. High precision measuring devices and methods have therefore become widely utilized.

In conventional measuring methods, methods using photoelectric remote measuring have many advantages, they avoid the jamming associated with mechanical methods, have large working distances, high measuring precision, high operating speed, and a wide range of application. Out of the various methods of no-contact measurement, remote measuring using optical laser triangulation is most widely utilized due to its simple apparatus and ease of use.

A conventional method of remote measurement using laser optical triangulation mainly consist of a laser source, a lens and a light sensitive transducer. The laser source illuminates an aim point of on the object being measured, and an image point of the aim point is formed on the light sensitive transducer through the lens. As the object moves, the image point moves correspondingly. By measuring the distance that the image point moves, the displacement of the object can be computed.

However, in a measuring process using single point laser optical triangulation, when the object moves two equal distances, the movement distances of the image point are unequal. That is, the measuring method is not linear, thus complicating the calculations. In addition, the measuring precision is effected by the quality of the lens.

What is needed, therefore, is a method for measuring a displacement of an object with an simple algorithm program.

SUMMARY

A method for measuring a displacement of an object having a flat surface according to one preferred embodiment includes the following steps. When the object is in a first position, a first laser beam is emitted onto the flat surface of the object at a first incident angle, the first laser beam is then reflected by the flat surface of the object and incident onto a light sensitive transducer at a first incident location thereon at a second incident angle. The object is then moved to a second position in a manner such that the flat surface of the object in the second position is parallel to the flat surface of the object in the first position, a second laser beam is emitted onto the flat surface of the object at the first incident angle, the second laser is then reflected by the flat surface of the object and incident onto the light sensitive transducer at a second incident location thereon at the second incident angle. The displacement of the object is then calculated from the distance between the first and second incident locations.

An apparatus for measuring a displacement of an object having a flat surface according to another preferred embodiment includes a laser source configured for emitting first and second laser beams to the flat surface of the object at a first incident angle when the object is in either its first or second position, and a light sensitive transducer configured for receiving the incident first and second laser beams reflected from the object at a second incident angle when the object is in either its first or its second incident location thereon.

The present method is an improvement over conventional methods for measuring displacement of an object as the displacement of the object is calculated with a linear algorithm program, the displacement can be calculated easily without complex operations. Thus the present method for measuring a displacement of an object is more simple.

Other advantages and novel features will become more apparent from the following detailed description of present method, when taken in conjunction with the accompanying drawings.

BRIEF DESCRIPTION OF THE DRAWINGS

Many aspects of the present method and apparatus can be better understood with reference to the following drawings. The components in the drawings are not necessarily drawn to scale, the emphasis instead being placed upon clearly illustrating the principles of the present method and apparatus. Moreover, in the drawings, like reference numerals designate corresponding parts throughout the several views, in which.

DETAILED DESCRIPTION OF PREFERRED EMBODIMENTS

Reference will now be made to the drawings to describe preferred embodiment of the present method for measuring a displacement of an object having a flat surface in detail.

Figure 1:
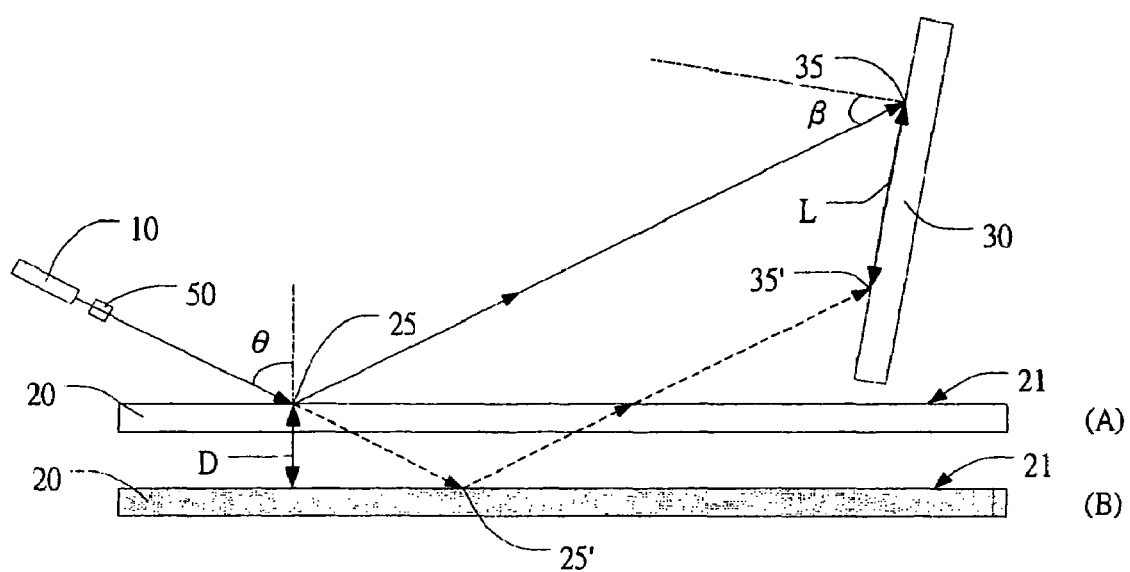
FIG. 1 is a schematic view showing a method for measuring a displacement of an object having a flat surface in accordance with a first preferred embodiment.

Referring to FIG. 1, a method for measuring a displacement of an object having a flat surface, the displacement being in the direction normal to the flat surface, in accordance with a first preferred embodiment is shown. The method includes following steps:

The first step involves positioning an object 20 in a first position (A), a laser source 10 emits a first laser beam onto a flat surface 21 at a certain first incident angle θ. The laser beam is reflected by the flat surface 21 of the object 20 at a first reflection point 25 and is then incident onto a light sensitive transducer 30 at a first incident location 35 at a second incident angle β. Thus the first incident location 35 is formed. The light sensitive transducer 30 can be either a charge-coupled device transducer (CCD) or a complementary metal-oxide semiconductor transducer (CMOS). The first step may further include a step of providing a collimating lens 50 for collimating the first and second laser beams emitted from the laser source 10.

The second step involves moving the object 20 a second position (B) in a manner such that the flat surface 21 of the object 20 in the second position (B) is parallel to the flat surface 21 of the object 20 in the first position (A). The laser source 10 then emits a second laser beam to the flat surface 21 of the object 20 at the first incident angle θ. The laser beam is reflected by the flat surface 21 at a second reflection point 25' and is then incident onto the light sensitive transducer 30 at a second incident location 35' thereon at the second incident angle β. Thus the second incident location 35' is formed.

The third step involves calculating the displacement of the object 20 according to a distance between the first and second incident locations. A distance L between the first incident location 35 and the second incident location 35' can be measured. The displacement can be calculated using the equation D=L*cos β/2 sin θ. D is the displacement between the first position (A) and the second position (B). The angle θ is the first incident angle when laser beam illuminates the surface 21. The angle β is the second incident angle when the first and second laser beams reflected by the flat surface 21 are incident onto the light sensitive transducer at the first and second incident locations thereon. The laser source 10 can be either a semiconductor laser or a gas laser. Preferably, at least one of the angle θ and the angle β is greater than about 30°. Preferably, both the angle θ and the angle β are greater than about 30°.

The ratio between the displacements L and D obeys the equation L/D=2 sin θ/cos β. Thus the amplifying effect of the displacement D can be adjusted through changing the angle θ and/or the angle β.

An apparatus for measuring a displacement of an object having a flat surface, the displacement being in a direction normal to the flat surface, generally includes a laser source 10 configured for emitting first and second laser beams to the flat surface 21 of the object 20 at a first incident angle θ when the object is at either first or second positions, and a light sensitive transducer 30 configured for receiving the incident first and second laser beams reflected from the object 20 at a second incident angle β at their respective first and second incident locations thereon. The apparatus further includes a collimating lens 50 arranged adjacent to the laser source 10, the collimating lens 50 is configured for collimating the first and second laser beams emitted from the laser source. The laser source 10 is either a semiconductor laser or a gas laser. The light sensitive transducer 30 is one of a charge couple device transducer and a complementary metal-oxide semiconductor transducer.

Figure 2:
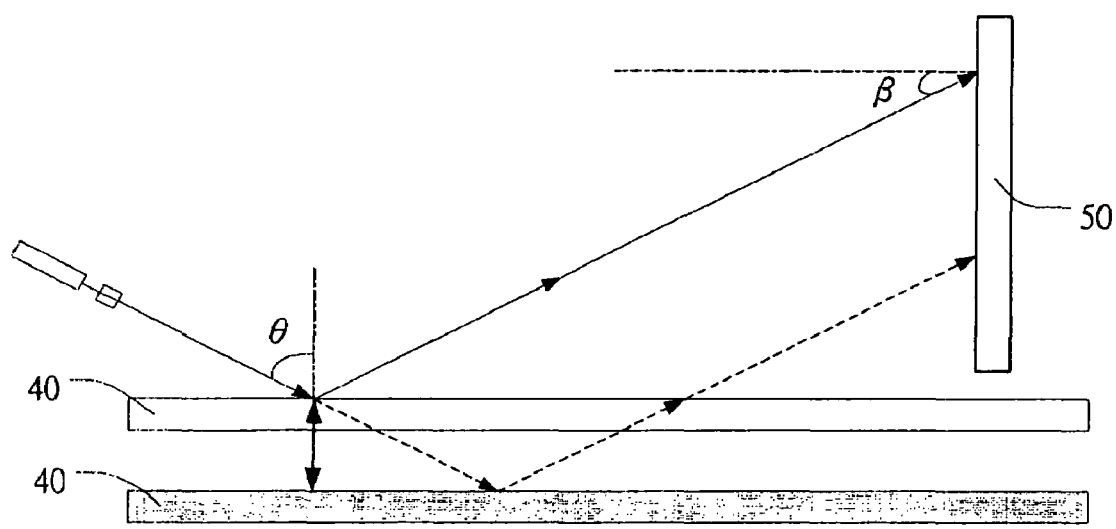
FIG. 2 is a schematic view showing a method for measuring a displacement of an object having a flat surface in accordance with a second preferred embodiment.

Referring to FIG. 2, a method for measuring a displacement of an object having a flat surface in accordance with a second preferred embodiment is shown. The method is the same as that of the first preferred embodiment except that a light sensitive transducer 50 is oriented to be perpendicular to the flat surface of an object 40. Therefore, the angle θ and the angle β satisfy the equation θ+β=90°. That is, a sine of the angle θ is always equal to a cosine of the angle β. The amplification ratio of the displacement D is always equal to two. Therefore, the measuring precision remains constant with the angle θ and the angle β changing.

Compared with the conventional method for measuring a displacement of an object, the present method has following advantages. Because the equation L/D=2 sin θ/cos β is linear, the displacement D can be calculated easily without complicated operation. Thus the present method is more simple.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. An apparatus for measuring a displacement of an object having a flat surface, the displacement being in the direction normal to the flat surface, the apparatus comprising:
   a laser source configured for respectively emitting first and second laser beams to the flat surface of the object at a first incident angle when the object is in first and second positions; and
   a light sensitive transducer configured for directly receiving the incident first and second laser beams reflected from the object at a constant second incident angle at respective first and second incident locations thereon.

2. The apparatus as claimed in claim 1, wherein the laser source is selected from the group consisting of semiconductor lasers and gas lasers.

3. The apparatus as claimed in claim 1, wherein the light sensitive transducer selected from the group consisting of charge-coupled device transducers and complementary metal-oxide semiconductor transducers.

4. The apparatus as claimed in claim 1, further comprising a collimating lens arranged adjacent to the laser source, the collimating lens being configured for collimating the first and second laser beams emitted from the laser source.

5. The apparatus as claimed in claim 1, wherein at least one of the first incident angle and the second angle is greater than 30°.

6. The apparatus as claimed in claim 1, wherein both of the first incident angle and the second incident angle are greater than 30°.

7. The apparatus as claimed in claim 1, wherein the light sensitive transducer is oriented to be perpendicular to the flat surface of the object.

8. The apparatus as claimed in claim 1, wherein the displacement of the object is calculated by a linear algorithm program using an equation D=L*cosβ/2sinθ, with D being the displacement of the object, L being a distance between the first incident location and the second incident location, θ being the first incident angle, and β being the second incident angle.

* * * * *